United States Patent [19]

Balsells

[11] Patent Number: 4,655,462
[45] Date of Patent: Apr. 7, 1987

[54] CANTED COILED SPRING AND SEAL

[75] Inventor: Peter J. Balsells, 17592 Sherbrook Dr., Tustin, Calif. 92680

[73] Assignees: Peter J. Balsells; Joan C. Balsells, both of Tustin, Calif.

[21] Appl. No.: 689,451

[22] Filed: Jan. 7, 1985

[51] Int. Cl.[4] .......................... F16J 15/24; F16F 1/06
[52] U.S. Cl. ..................... 277/164; 277/163; 277/205; 267/1.5; 267/61 R; 267/167; 267/180
[58] Field of Search ............... 267/1.5, 166, 167, 180, 267/61 R; 277/157, 158, 163, 164, 205, 206 R

[56] References Cited

U.S. PATENT DOCUMENTS

| | | | |
|---|---|---|---|
| 2,449,479 | 9/1948 | Hopper et al. | 267/167 X |
| 2,525,730 | 10/1950 | Schulze | 267/167 X |
| 2,797,937 | 7/1957 | Frishof | 267/167 X |
| 3,087,038 | 4/1963 | Bethke | 267/167 X |
| 3,223,426 | 12/1965 | Reid | 277/205 X |
| 3,323,785 | 6/1967 | Mather | 267/167 |
| 3,359,617 | 12/1967 | Baumler | 267/167 X |
| 3,653,670 | 4/1972 | Sifri et al. | 277/205 X |
| 3,847,389 | 11/1974 | Rogers | 277/205 X |
| 3,966,183 | 6/1976 | Mayer | 267/167 |
| 4,067,407 | 1/1978 | Berg | 277/205 X |
| 4,143,883 | 3/1979 | Paynter | 277/205 X |
| 4,244,192 | 1/1981 | Chellis | 277/205 X |
| 4,304,409 | 12/1981 | Orlowski | 277/205 X |

FOREIGN PATENT DOCUMENTS 46-9086  3/1971 Japan ...................... 267/180
409677  4/1934 United Kingdom ............ 267/61

OTHER PUBLICATIONS

*Handbook of Mechanical Spring Design*, Associated Spring Corporation, Bristol, Conn., 1956.

Primary Examiner—Robert S. Ward
Attorney, Agent, or Firm—Walter A. Hackler

[57] ABSTRACT

A coiled spring includes a plurality of coils with each of the coils being interconnected with one another in a spaced-apart relationship and disposed in a preselected acute angle with the centerline of the coil spring for causing the coil spring to exert a constant force in a loading direction approximately normal to the centerline of the coiled spring in response to a deflection of the coil spring along the loading direction. When placed in an operative relationship with a sealing material, the resulting coil spring seal enables positive sealing between cooperating parts to prevent passage of fluid therepast, despite small changes in the spacing between the parts which may change due to eccentricity and part dimension, wear, temperature, or pressure effects.

23 Claims, 14 Drawing Figures

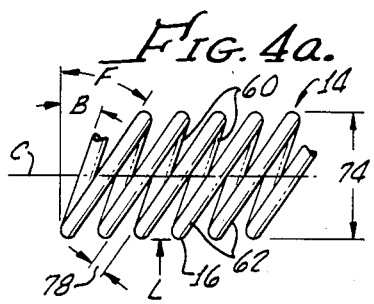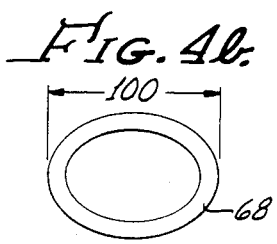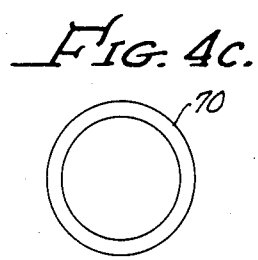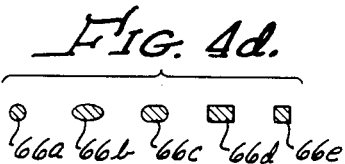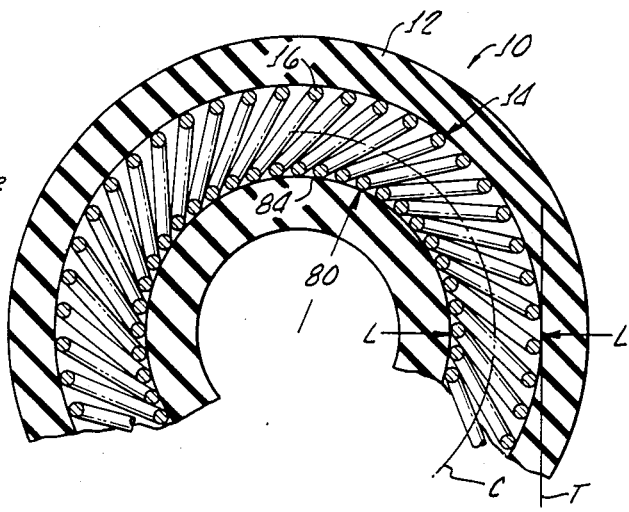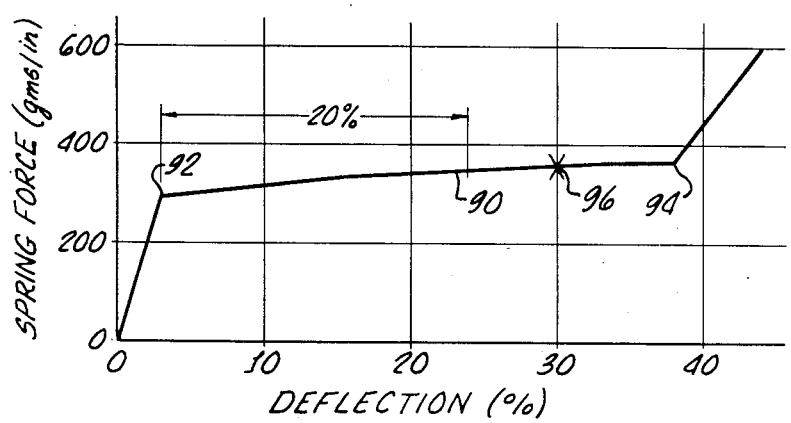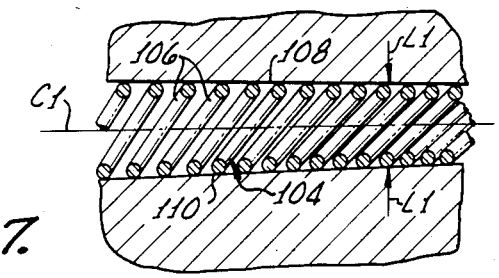

CANTED COILED SPRING AND SEAL

The present invention generally relates to a coiled spring and seal and, more particularly, relates to a coiled spring having canted coils, which can exert a generally constant force in response to a deflection of the coiled spring which, when combined with a sealing material, can provide a constant sealing force between two surfaces, including cooperating moving, or movable, parts.

Coiled springs have been used for many years to maintain pressure between contacting surfaces. Springs, like most elastic bodies, exert a force when they are deflected, generally in accordance with Hooke's Law.

That is, most springs upon loading develop a force which is generally proportional to the deflection of the spring.

While this characteristic may be used to advantage in many devices, it presents a serious disadvantage in many applications where the spring is to exert a sealing force between two contacting surfaces.

For example, in cooperating, or mating, parts which experience movement therebetween, dimensions of the mating parts may vary because of wear, temperature or pressure changes, in addition to dimensional eccentricities of the parts.

A typical sealing spring disposed between such cooperating parts is deflected by the parts as it forms forms a seal therebetween. This deflection results in a force exerted between the mating parts, which, in cooperation with the sealing material, prevents fluid from passing therepast.

It should be appreciated that, in accordance with Hooke's Law, as these cooperating parts change in dimension as hereinbefore noted, the distance between them increases, hence the deflection of the spring seal is decreased as it expands to fill the increasing gap between the mating parts.

When this occurs, the force exerted by these spring seals is reduced, hence, increasing the likelihood of fluid leakage therepast.

To overcome this situation, seal springs are typically deflected far past that amount necessary to provide a seal in order to accommodate for wearing of the parts.

This, unfortunately, causes a much greater force between the mating parts than should be necessary.

The spring and seal of the present invention has the advantage of providing constant force over a large spring deflection, which is ideally suited for providing a seal between cooperating, or mating, moving parts, despite dimensional variations in the parts due to tolerances, wear, eccentricities, tapering of mating parts, and temperature or pressure induced changes in the parts.

SUMMARY OF THE INVENTION

In accordance with the present invention, a coiled spring includes a plurality of coil means, with each of the coil means being interconnected with one another in a spaced-apart relationship and disposed at a preselected acute angle with a centerline of a coiled spring, for causing the coiled spring to exert a constant force in a loading direction approximately normal to the centerline in response to deflection of the coiled spring along the loading direction.

This constant force is exerted over a preselected range of deflection of the coiled spring along the loading direction, and may be from about 10% to about 30% of the coiled spring height.

The coiled spring, in accordance with the present invention, includes coil means which are canted with respect to a centerline of the coiled spring, with each of the coil means having a back portion and a forward portion with the back portion making a back angle with the centerline, which is greater than about 1 degree, and the front portion making a front angle with the centerline, which is less than about 30 degrees.

The coil means may include a winding of wire having a circular cross-section, and the coil means itself may have an elliptical cross-section, which is centered about the coil spring centerline. In addition, the ends of the coiled springs may be joined to form a garter-type spring. In this latter configuration, the loading direction of the garter-type coiled spring is approximately normal to a tangent to its centerline.

When combined with a sealing material, which may or may not be resilient, the plurality of coiled means cooperate with the sealing material for causing the coiled springs to exert a constant force against the sealing material, as hereinabove-described, in order to create a sealing between two mating parts in a manner enabling a constant force to be exerted thereby, despite irregularities, eccentricities, wear or other dimensional changes affecting the spacing between the mating parts and, hence, the amount of deflection on the coiled spring seal.

BRIEF DESCRIPTION OF THE DRAWINGS

The advantages and features of the present invention will appear from the following description when considered in conjunction with the accompanying drawings, in which:

FIG. 4a is an enlarged side view of the coil means of the present invention;

FIG. 4b is an end view of the spring shown in FIG. 4a is taken along a centerline thereof and generally showing an elliptical configuration when the coil means are canted;

FIG. 4c is an end view of the spring shown in FIG. 4a taken along a centerline thereof and generally showing a more circular configuration when the coil means are less canted than as shown in FIG. 4b;

FIG. 4d is a series of cross-sectional view of various wire types which may be utilized in the present invention;

FIG. 5 is a cross-section of a portion of a continuous garter-type coiled spring, in accordance with the present invention, showing the spring under compression;

FIG. 6 is a plot of the force vs. deflection for a specific example of a coiled spring made in accordance with the present invention;

FIG. 7 is an illustration of a specific example of a linear coiled spring, in accordance with the present invention, showing the spring in a position for applying even forces between two surfaces that are non-parallel;

DETAILED DESCRIPTION

Figure 1:
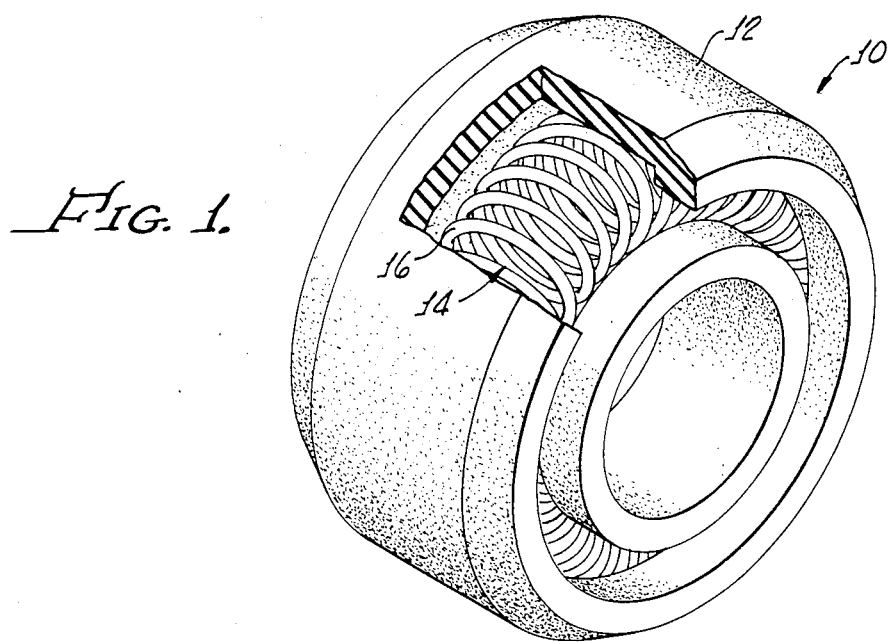
FIG. 1 is a perspective view of a coiled spring seal, in accordance with the present invention, partially broken away to show a plurality of coil means.

Turning now to FIG. 1 there is shown a coiled spring seal 10, in accordance with the present invention, generally including a torrodial-shaped seal material 12, which may be molded or machined from any suitable elastic material, such as a resilient elastomer, or plastic, with a coiled spring 14 therein formed into a continuous garter-type shape and including a plurality of canted coil means 16, which are disposed in an operative relationship with the seal material for causing the coil spring to exert force against the seal material in a loading direction L, (see FIG. 5). The coiled spring 14 may be made from a number of alloys such as stainless steel, Inconel, Hastelloy and Elgiloy, among others.

As can be seen in FIG. 5, the loading direction L is approximately normal to a tangent T to a centerline C of the coiled spring.

Operation of the coiled spring seal 10 will be hereinafter discussed in greater detail.

Figure 2:
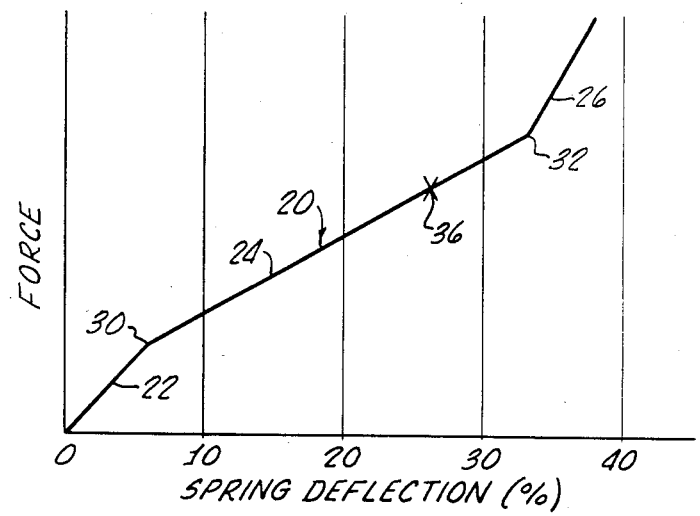
FIG. 2 is a plot of force vs. spring deflection of a typical prior art spring generally showing the elasticity of the spring, in accordance with Hooke's Law.

As hereinbefore-mentioned, prior art coiled springs (not shown) have been manufactured for many years and such springs have typically reacted with a proportional force to a deflection of the spring, as is represented in FIG. 2.

The force deflection curve 20 shown in FIG. 2, is typical of such prior art springs with the force deflection curve 20 generally including three portions, an initial force deflection region 22, an operating force deflection region 24, and an overload force deflection region 26, with the operating force deflection region extending between a first point 30 and a second point 32.

Prior art springs generally follow the principle of Hooke's Law. That is, as shown in FIG. 2, the force/deflection curve 20 of a prior art spring exhibits a generally proportional relationship throughout the three portions or regions 22, 24, 26.

It can be seen from FIG. 2 that prior art springs are usually initially loaded, or deflected, at a point 36 within the operating region 24 of the curve. Any change in the amount of deflection results in a change of force exerted by the prior art spring, which is proportional to the change in deflection.

As hereinbefore-mentioned, and as will be hereinafter-described, in specific applications of coiled springs and coiled spring seals, the force/deflection relationship of conventional coiled springs may be a significant disadvantage.

Figure 3:
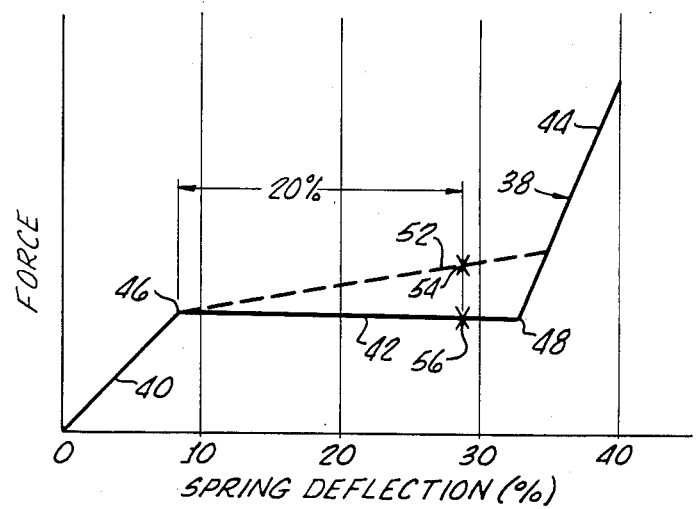
FIG. 3 is a plot of force vs. deflection for a spring constructed in accordance with the present invention, showing that the coiled spring of the present invention exerts a generally constant force over a large spring deflection range.

By comparison, a force/deflection curve 38, as illustrated in FIG. 3 for the coiled spring 14, made in accordance with the present invention, also may be described by three portions.

That is, curve 38, is comprised of an initial region 40, an operating region 42 and an overload region 44.

In the initial portion 40 of the force/deflection curve 40 is generally linear up to a transition point 46. At that point, the force exerted by the spring in response to a deflection of the spring, between about 10% and about 30% deflection, remains constant, despite the amount of spring deflection in the operating range, up until an overload point 48, after which a significant increase in force occurs in response to the spring deflection.

The coiled spring 14 also may be constructed so that a linear portion 52 thereof, shown by the dash line 52 in FIG. 3, may exhibit a gradual proportionality between force and spring deflection as may be desirable in certain circumstances.

In fact, it has been found that a ratio, or flat force factor (FFF) may be used to determine the usefulness of a specific spring, the FFF being defined as:

$$FFF = \frac{\left[\begin{array}{c} \text{Force at 20\%} \\ \text{Deflection From} \\ \text{Transition Point} \end{array}\right] - \left[\begin{array}{c} \text{Force at} \\ \text{Transition} \\ \text{Point} \end{array}\right]}{[\text{Force at 20\% deflection from transition point}]}$$

When the spring exhibits a constant force as shown in FIG. 3 by the operating region 42, the FFF=0.

It has been found that a spring having an FFF of up to about 0.3 may be useful as is represented in FIG. 3 by the dashed line 52.

In operation, the coiled spring 14, in accordance with the present invention, is initially loaded with a specific spring deflection, as shown by the point 56 in the operating region 42 of the curve 38 in FIG. 3.

It is evident from curve 38 that a change in deflection of the spring, as may occur in the hereinbelow-described examples, will not affect the force exerted on the spring. Because the sealing force remains constant, a positive seal is established between mating parts (not shown on FIG. 3) despite dimensional changes in the mating parts caused by, for example, wear, eccentricities, temperature, and pressure changes.

Turning now to FIG. 4, there is shown a portion of the coiled spring 14, specifically showing each of the coil means 16, having a back portion 60 and a front portion 62 with the back portion being disposed at a back angle B, with the centerline C and the front portion 62 being disposed at a front angle F with the centerline C.

It has been discovered that when the back angle is greater than about 1 degree and less than about 25 degrees, so as to enable consistent deflection of the spring in the loading direction L, and the front angle F is less than about 30 degrees, a characteristic force/deflection curve, as shown in FIG. 3, can be established.

This can occur when the coil means comprises a winding of wire 66 having an elliptical cross-section 68, as shown in FIG. 4b, or a circular cross-section 70, as shown in 4c, the smaller the front and back angles B, F, the more circular the curve section becomes.

It should be appreciated that the spring, in accordance with the present invention, may vary a great deal dimensionally, depending upon the load requirements and the size and spacing requirements for placement of the spring as may be determined without undue experimentation.

For example, the loading point, as illustrated in FIG. 3, at point 54, may be anywhere from 20 grams of force to 10 pounds of force, a coil height 74 may vary from about 0.025 inches to about 1 inch.

The wire 66 may be of a number of cross-sections, such as a circular cross-section, shown at 66a, ovate cross-section shown at 66b, oval cross-section as shown at 66c or a rectangular or square cross-section, as shown at 66d and 66e, respectively, depending on the specific loading and deflections characteristic desired.

Typical wire diameters for circular cross-section wire are from about 0.003 to about 0.080 inches and the coil spacing 76 is usually about 70% of the wire diameter selected.

It should be appreciated that the greater the spacing 78 of the coils, the greater the coil deflection, and the wider the useful portion 42 of the curve 38, shown in FIG. 3.

It must also be appreciated that the wider the coil spacing, the less uniform the force exerted by the spring 14 along the loading direction L and predetermined, according to the desired loading requirements. Hence, the coil spacing is determined, in part, on the loading and load distribution desired for a specific situation.

When the coiled spring 14 is in a garter-type shape, as illustrated in FIGS. 1 and 5, yet another parameter affects the useable constant force portion of the spring, as illustrated at 42 in FIG. 3.

This parameter is the ratio of the inside diameter 80 of the coiled spring 14 to the coil height 74, the coil height 74 being measured when the coil 14 is in an unloaded condition (see FIGS. 4a and 5).

It has been discovered that when this ratio is less than a value of about 15, the width of the constant force region of the spring, as illustrated at 42 between the points 46 and 48 in FIG. 3 begins to decrease and continues to decrease as the bend ratio decreases. Hence, it is preferable that the ratio of the inside diameter 80 to the unloaded coil height 74 be greater than a value of about 15.

In FIG. 5, the spring 14 is shown in a loaded position. When the coils 16 touch one another, as is shown by the point 84 at the inside diameter 80, the operating range of the spring 14 is reached at the upper point 48 thereof, as illustrated in FIG. 3, whereupon the amount of force exerted by the spring in response to additional spring deflection increases rapidly.

It can be appreciated that the number of configurations of springs, made in accordance with the present invention, can vary in extreme amount, as hereinabove-noted by the range of parameters that affect the force/deflection curve 38 of the spring coil 14.

However, as a specific example, there is shown in FIG. 6, a specific spring force versus deflection curve 90 for a coiled spring 14, having the following parameters and illustrating a generally flat force versus deflection/curve between points 92 and 94, in which the force exerted by the spring increases at most about 15%, as the deflection of the coil spring increases from about 4% to about 38% of the coil height along the loading direction L. Analyzing the force/deflection curve of FIG. 6 in terms of the FFF hereinbefore explained hereinabove:

$$FFF = \frac{350 - 300}{350} = 0.14$$

A typical initial loading point of the spring represented by the forced deflection curve 90 would be at about the point 96, which is about 300 grams per inch.

The spring represented by the curve 96 is one made of 302 stainless steel, having approximately 47 coils per inch and a circular wire diameter of 0.006 inches. The free coil height 74 is about 0.053 inches and the free coil width 100 (See FIG. 4b) 0.568 inches.

The specific coil example 14 was made with a back angle B of about 4 degrees, a front angle F of about 21 degrees, and coil spacing 76 of about 0.008 inches.

An alternative embodiment, in accordance with the present invention, is shown in FIG. 7 as a linear-type coiled spring 104 having a plurality of coil means 106 interconnected with one another in a spaced-apart relationship, and disposed at a preselected acute angle with a centerline C1 for causing the coiled spring 104 to exert the force in a loading direction L1 approximately normal to the centerline C1 over a preselected range of the deflection, as illustrated in FIG. 3.

This linear spring 104 embodiment is useful for applying uniform force between two uneven and/or non-parallel surfaces 108, 110, (see FIG. 7) as may be encountered in the sealing of oven doors and the like, which may be subjected to distortion by heating of the oven door, or forced into misalignment by physical abuse.

Figure 8:
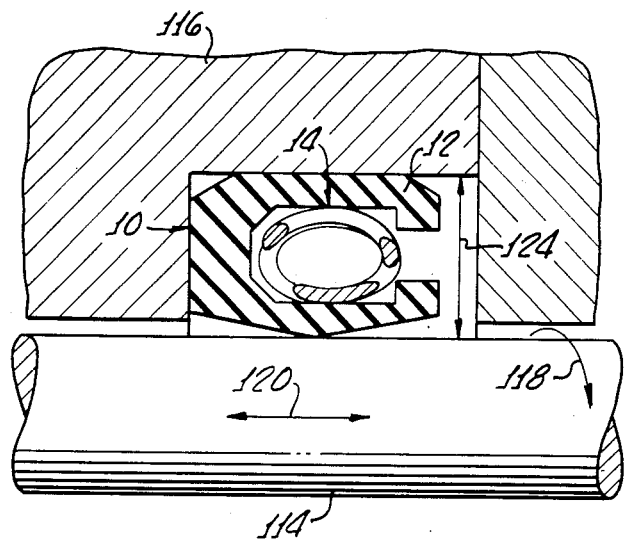
FIG. 8 is an illustration of a coiled spring seal, in accordance with the present invention, showing the seal as applied between a shaft and a housing.

The coiled spring seal 14 is shown in FIG. 8 in an application for providing a seal between a rotating shaft 114 and a housing 116. The movement of the shaft 114 may be rotational, as indicated by an arrow 118, or translational, as illustrated by an arrow 120.

It should be readily apparent from FIG. 8 that as the shaft 114 is moved, as illustrated by the arrow 120, the distance 124 between the shaft 114 and the housing 116, may vary because of slight variations in the diameter of, and eccentricities in, the shaft 114, hence changing the deflection of the coiled spring 14 within the coil spring seal 10. In addition, heating of the shaft and wearing of the shaft will also affect this distance.

However, since the coiled spring seal 10 is made in accordance with the present invention and exhibits a force/deflection curve, as illustrated in FIG. 3, these dimensional changes will not appreciably change the force exerted by the coil spring seal between the housing 116 and the shaft 114, thereby maintaining a secure seal therebetween.

Figure 9:
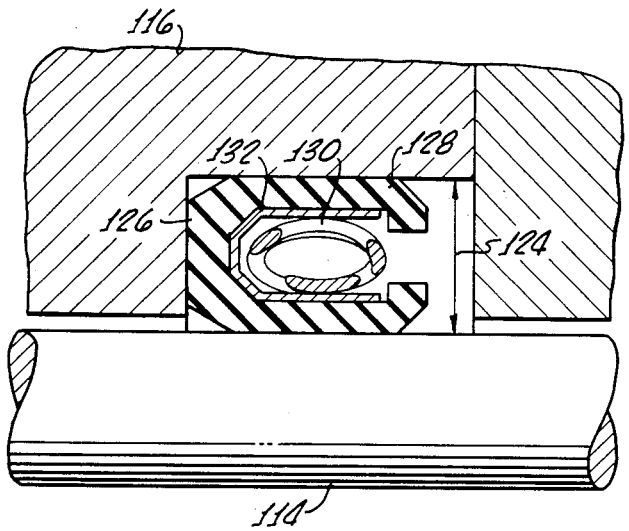
FIG. 9 is an illustration showing the garter-type spring shown in FIG. 5 in combination with the resilient material and a U-shaped circular support.

As shown in FIG. 9, yet another embodiment of the present invention, as represented by the coiled spring seal 126, which is comprised of a seal material 128 having a generally torrodial shape, and may be comprised of soft plastic or a hard plastic or a metal, and a plurality of coils 130 of similar construction to the coil 14 illustrated in FIGS. 1 and 8.

In addition, the coiled spring seal 126 also includes a coil support 132, which may be formed from a spring material to provide increased loading capability of the coiled spring seal 130. That is, the support 132 may be made in a manner and of the material so as to provide its own spring load, but the combination of the support 132 and the coiled spring 130 results in a forced spring deflection characteristic, as shown in FIG. 3, but with increased force. The same features regarding the sealing capability between the shaft 114 and the housing 16 are provided by the coiled spring seal 130, as were discussed in connection with the coiled spring 14 in FIG. 8.

Figure 10:
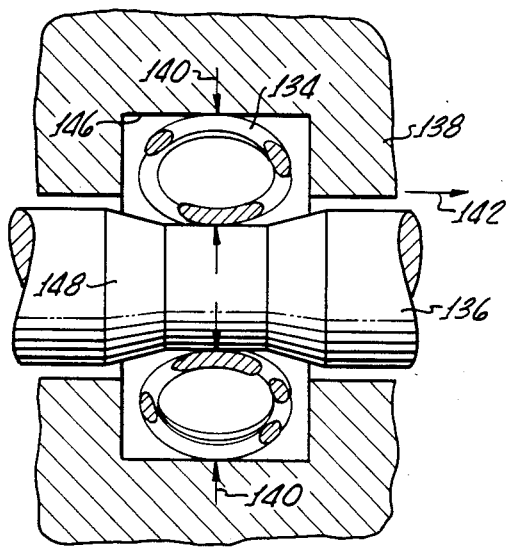
FIG. 10 is an illustration of a garter-type coiled spring seal, in accordance with the present invention, utilized in a pushed-pulled mechanism; and, FIG. 11 is an illustration of a coiled spring, in accordance with the present application, in combination with a seal material for providing a seal between two surfaces.

FIG. 10 shows another application of a coiled spring 134, in accordance with the present invention, having a generally torrodial shape, and useful in a push-pull mechanism, having a rod 136 and a housing 138.

The spring 134 exhibits a force/deflection characteristic, as represented in FIG. 3, and provides the same force against the loading direction 140 as the shaft is moved in the direction of the arrow 142.

The spring 134 is seated in a groove 146 in the housing 138 and also nested in a groove 148 in the shaft 136.

In operation, as the shaft is moved along the direction of the arrow 142 to operate a mechanism (not shown) a nearly constant force is exerted along the load line 140 between the shaft 136 and the housing 138.

Figure 11:
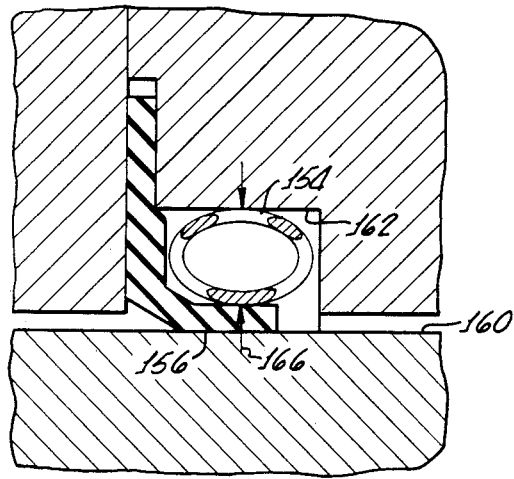

Yet another application of a coiled spring 154, in accordance with the present invention, is shown in FIG. 11, wherein the coil spring 154 is used in an operative relationship with an L-shaped seal material 156, to provide a seal between the services 160 and 162.

It should be appreciated that the surfaces 160, 162, may be either flat or round, depending upon the particular application, and the spring 154 provides a constant force as hereinbefore-discussed, despite variations in spring deflection due to changes in tolerances of the surfaces 160, tapering of the surfaces 160, 162, as well as all other parameters including temperature, pressure, wear, which affects the distance 166 between the surfaces 160 and 162.

Although there has been hereinabove-described a specific arrangement of a coiled spring and a seal, in accordance with the present invention, for the purposes of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention, as defined in the appended claims.

What is claimed is:

1. A continuous, garter-type coiled spring comprising:
   a plurality of coil means, each said coil means being interconnected with one another in a spaced-apart relationship and disposed at a preselected acute angle with a centerline of the coiled spring for causing the coiled spring to exert a force in a loading direction approximately normal to a tangent to the centerline in response to deflection of the coiled spring along said loading direction, said force being generally constant over a preselected range of deflection of the coiled spring along the loading direction.

2. A continuous, garter-type coiled spring comprising:
   a plurality of coil means, each said coil means being interconnected with one another in a spaced-apart relationship and disposed at a preselected acute angle with a centerline of the coiled spring for causing the coil spring to exert a force in a loading direction approximately normal to a tangent to centerline in response to deflection of the coiled spring along said loading direction, said force increasing at most about 30% as deflection of the coiled spring increases from about 10% to about 30% of the coiled spring height along the loading direction.

3. The continuous, garter-type coiled spring according to claims 1 or 2 wherein the continuous garter-type coiled spring has a generally elliptical shape and a ratio of an inside diameter of the continuous garter-type coiled spring to a coil height has a value greater than about 15.

4. The coiled spring according to claim 3 wherein the preselected range of deflection is from about 10% to about 30% of the coiled spring height.

5. The coiled spring according to claim 1 wherein the coil means are canted with respect to a centerline thereof, with each coil means having a back portion and a forward portion, said back portion being disposed at a back angle with the centerline and said forward portion being disposed at a front angle with the centerline, said front angle being greater than said back angle.

6. The coiled spring according to claim 5 wherein the back angle is greater than about 1 degree and less than about 25 degrees.

7. The coiled spring according to claim 6 wherein the front angle is less than about 30 degrees.

8. The coiled spring according to claim 5 wherein the coil means comprise a winding of wire having circular cross-section.

9. The coiled spring according to claim 5 wherein the coil means comprise a winding of wire having an elliptical cross section.

10. The coiled spring according to claim 8 or 19 wherein the coil means has a circular cross-section centered about the coiled spring centerline.

11. The coiled spring according to claim 8 or 9 wherein the coil means has an elliptical cross-section centered about the coiled spring centerline.

12. A continuous, garter-type coiled spring seal comprising:
   a resilient material; and, a plurality of coil means disposed in an operative relationship with said resilient material for causing the coiled spring to exert a force against said resilient material in a loading direction approximately normal to a tangent to a centerline of the coil means in response to deflection of the coiled spring along said loading direction, each said coil means being interconnected with one another in a spaced-apart relationship and disposed at a preselected acute angle with a centerline of the coiled spring, said force being generally constant over a preselected range of deflection of the coiled spring along the loading direction.

13. A continuous, garter-type coiled spring seal comprising:
   a resilient material; and, a plurality of coil means in an operative relationship with said resilient material for causing the coiled spring to exert a force against said resilient material in a loading direction approximately normal to a tangent to a centerline of the coil means in response to deflection of the coiled spring along said loading direction, each said coil means being interconnected with one another in a spaced-apart relationship and disposed at a preselected acute angle with a centerline of the coiled spring, said force increasing at most about 30% as deflection of the coiled spring increases from about 10% to about 30% of the coiled spring height along the loading direction.

14. The continuous, garter-type coiled spring seal according to claim 12 wherein the preselected range of deflection is from about 10% to about 30% of the coiled spring height.

15. The continuous, garter-type coiled spring seal according to claim 12 or 13 wherein the coil means is disposed within said resilient material.

16. The continuous garter-type coiled spring seal according to claim 15 wherein the continuous garter-type coiled spring has a generally circular shape and a ratio of an inside diameter of the continuous garter-type coiled spring to a coil height has a value greater than about 15.

17. The continuous, garter-type coiled spring seal according to claim 12 wherein the coil means are canted with respect to the centerline thereof, with each coil means having a back portion and a forward portion, said back portion being disposed at a back angle with the centerline and said forward portion being disposed at a front angle with the centerline, said front angle being greater than said back angle.

18. The continuous, garter-type coiled spring seal according to claim 17 wherein the back angle is greater than about 1 degree and less than about 25 degrees.

19. The continuous, garter-type coiled spring seal according to claim 18 wherein the front angle is less than about 30 degrees.

20. The continuous, garter-type coiled spring seal according to claim 12 wherein the coil means comprise a winding of wire having circular cross-section.

21. The continuous, garter-type coiled spring seal according to claim 15 wherein the coil means comprise a winding of wire having an elliptical cross-section.

22. The continuous, garter-type coiled spring seal according to claim 20 wherein the coil means has an approximately circular cross-section centered about the coiled spring centerline.

23. The continuous, garter-type coiled spring seal according to claim 20 wherein the coil means has an elliptical cross-section centered about the coiled spring centerline.

* * * * *